(12) United States Patent
Tobori et al.

(10) Patent No.: US 7,914,708 B2
(45) Date of Patent: Mar. 29, 2011

(54) CONDUCTIVE MASTERBATCH AND RESIN COMPOSITION INCLUDING THE SAME

(75) Inventors: Norio Tobori, Tokyo (JP); Hideo Komatsu, Tokyo (JP); Kotaro Tanaka, Tokyo (JP); Kazuaki Uchiyama, Tokyo (JP)

(73) Assignee: Lion Corporation, Tokyo (JP)

( * ) Notice: Subject to any disclaimer, the term of this patent is extended or adjusted under 35 U.S.C. 154(b) by 0 days.

(21) Appl. No.: 11/666,761

(22) PCT Filed: Oct. 31, 2005

(86) PCT No.: PCT/JP2005/020043
§ 371 (c)(1),
(2), (4) Date: Oct. 12, 2007

(87) PCT Pub. No.: WO2006/049139
PCT Pub. Date: May 11, 2006

(65) Prior Publication Data
US 2008/0191176 A1 Aug. 14, 2008

(30) Foreign Application Priority Data

Nov. 4, 2004 (JP) .................................. 2004-320612

(51) Int. Cl.
*H01B 1/06* (2006.01)
(52) U.S. Cl. ......... 252/511; 252/500; 524/496; 525/178
(58) Field of Classification Search .................. 252/500, 252/511, 512; 430/108.22, 108.23; 524/496; 525/178
See application file for complete search history.

(56) References Cited

U.S. PATENT DOCUMENTS

| 5,643,502 | A * | 7/1997 | Nahass et al. ................... 252/511 |
| 6,350,552 | B1 * | 2/2002 | Livengood et al. ...... 430/108.22 |
| 6,942,823 | B2 * | 9/2005 | Terada et al. ................... 252/511 |
| 7,008,991 | B2 * | 3/2006 | Takagi et al. ................... 524/496 |
| 2003/0027071 | A1 * | 2/2003 | Tazawa et al. ........... 430/108.23 |
| 2003/0181591 | A1 * | 9/2003 | Warth et al. .................... 525/178 |
| 2005/0029498 | A1 * | 2/2005 | Elkovitch et al. ............. 252/500 |

FOREIGN PATENT DOCUMENTS

| EP | 1 388 564 A1 | | 2/2004 |
| JP | 1-131251 | | 5/1989 |
| JP | 2-91160 | | 3/1990 |
| JP | 02-140252 | * | 5/1990 |
| JP | 03-059071 | * | 3/1991 |
| JP | 03-062851 | * | 3/1991 |
| JP | 4-74521 | | 3/1992 |
| JP | 5-503723 | | 6/1993 |
| JP | 8-508534 | | 9/1996 |
| JP | 11-035835 | * | 2/1999 |
| JP | 11-35835 | | 2/1999 |
| JP | 2001-2915 | | 1/2001 |
| JP | 2002-309101 | | 10/2002 |
| JP | 2002-322366 | | 11/2002 |
| JP | 2003-64254 | | 3/2003 |
| JP | 2003-277607 | * | 10/2003 |
| JP | 2005-232201 | * | 9/2005 |
| WO | WO 91/01621 A2 | | 2/1991 |
| WO | WO 94/23433 A1 | | 10/1994 |
| WO | WO 2004/015000 A1 | | 2/2004 |

* cited by examiner

*Primary Examiner* — Mark Kopec
*Assistant Examiner* — Khanh Tuan Nguyen
(74) *Attorney, Agent, or Firm* — Kratz, Quintos & Hanson, LLP

(57) ABSTRACT

The present invention is to provide a conductive masterbatch using a polyamide resin, the conductive masterbatch that has an excellent kneadability/manufacturability and formability and an excellent dispersibility of conductive fillers such as a carbon black, and shows stable conductivity even when a large amount of such conductive fillers are contained therein, and a resin composition containing the conductive masterbatch. That is, the present invention is to provide the conductive masterbatch, which includes at least a conductive filler selected from carbon blacks and carbon nanotubes, a polyamide resin, and a copolymer which contains at least a vinyl monomer having a functional group reactive with the polyamide resin and a styrene as monomer units, and in which the content of the conductive filler is in the range of 10% by mass to 40% by mass, and the resin composition containing the conductive masterbatch.

4 Claims, No Drawings

CONDUCTIVE MASTERBATCH AND RESIN COMPOSITION INCLUDING THE SAME

TECHNICAL FIELD

The present invention relates to a conductive masterbatch, which contains a large amount of conductive fillers such as a carbon black, and a resin composition containing the conductive masterbatch.

BACKGROUND ART

In recent years, conductive resin compositions that are made from thermoplastic resins (such as polyamide resins) filled with conductive material (such as carbon blacks) has been commonly used for, for example, packing material for IC chips, and used in automobile parts aiming at electrostatic discharge prevention because of its excellent physical strength and abrasion resistance and cheap production cost.

However, depending on types of conductive material, adding conductive material may degrade the mechanical property and formability of such thermoplastic resins. For example, when the conductive material is a carbon black, the property of the carbon black will degrade the flexibility and formability of a complexed conductive resin composition, and furthermore, because of non-uniformity of carbon black dispersion, sufficient conductivity will not be obtained in a compact of the resin composition. Additionally, when the composition is filled with a large amount of carbon black, the kneadability/manufacturability of the composition will be significantly degraded.

Especially when the thermoplastic resin is a polyamide resin, a high load will be generated during kneading that polyamide resin to mix with carbon black, and carbon gel will be generated, causing insufficient dispersion during a forming process.

In order to solve such problems, many methods have been proposed. For example, Patent Literature 1 proposes a conductive resin composition that contains a polyamide resin, which is composed of a carbon black and plasticizers such as a sulfonamide derivative. Moreover, Patent Literature 2 proposes a conductive resin composition that contains a polyamide resin, which is mixed with a carbon black and ester compounds such as a polyglycerine ester. Furthermore, Patent Literature 3 proposes a conductive resin composition that contains a polyamide resin, which is mixed with a carbon black and a carboxylic acid or an anhydride thereof.

However, the content of such carbon blacks in those conductive resin compositions still needs to be small because a large content thereof will significantly degrade the kneadability/manufacturability of the compositions.

In recent years, carbon nanotubes, which can be used as a conductive material in a similar way to carbon blacks, have been newly developed and application thereof has been examined. For example, Patent Literature 4 and 5 propose complex materials, in which resins of the materials contain carbon nanotubes that are 3.5 nm to 70 nm long in diameter and have lengths 5 or more times as long as their diameters, and production methods thereof. Furthermore, Patent Literature 6 proposes a polymer composition having a carbon nanotube content of 0.25% by mass to 50% by mass, an IZOD impact strength (with notch) of larger than about 2 feet-pound/inch and a volume resistivity of smaller than $1 \times 10^{11} \Omega/cm$. And it further proposes producing master pellets having a large concentration of carbon nanotubes and adding the master pellets into resin.

However, the carbon nanotubes are dispersed into resin only using mechanical methods, diluting produced masterbatches, thus stable dispersion, or dispersion at a practical state, of the carbon nanotubes into resin has been still yet to be achieved.

Patent Literature 1: Japanese Patent Application Laid-Open (JP-A) No. 2001-2915
Patent Literature 2: Japanese Patent Application Laid-Open (JP-A) No. 2002-309101
Patent Literature 3: Japanese Patent Application Laid-Open (JP-A) No. 2002-322366
Patent Literature 4: Japanese Patent Application Laid-Open (JP-A) No. 01-131251
Patent Literature 5: Japanese Patent Application Laid-Open (JP-A) No. 05-503723
Patent Literature 6: Japanese Patent Application Laid-Open (JP-A) No. 08-508534

DISCLOSURE OF INVENTION

An object of the present invention is to solve the forementioned problems and to achieve the following objectives; that is, the present invention is to provide a conductive masterbatch using a polyamide resin, the conductive masterbatch that has an excellent kneadability/manufacturability and formability and an excellent dispersibility of conductive fillers such as a carbon black, and shows stable conductivity even when a large amount of such conductive fillers are contained therein, and a resin composition containing the conductive masterbatch.

The inventors of the present invention conducted examination to solve the forementioned problems and found that the problems are solved by having a polyamide resin contained a particular copolymer when the polyamide resin is filled with conductive fillers.

The present invention is based on the above-stated knowledge of the inventors, and methods to solve the above-stated problems are as follows:

that is, the present invention is
<1> A conductive masterbatch, comprising:
a conductive filler selected from carbon blacks and carbon nanotubes,
a polyamide resin,
and a copolymer which contains at least a vinyl monomer having a functional group reactive with the polyamide resin and a styrene as monomer units,
wherein the content of the conductive filler is in the range of 10% by mass to 40% by mass.
<2> The conductive masterbatch according to item <1>, wherein
the copolymer is a graft copolymer in which a polymer side-chain, which has at least a monomer unit selected from styrenes and meta-acrylates, is bonded to a polymer main-chain, which has at least a vinyl monomer having a functional group reactive with the polyamide resin and a styrene as monomer units.
<3> The conductive masterbatch according to one of items <1> and <2>, wherein
the functional group reactive with the polyamide resin is reactive with a carboxyl group or an amino group which are bonded to a terminal of the polyamide resin.
<4> The conductive masterbatch according to any one of items <1> to <3>, wherein
the functional group reactive with the polyamide resin is at least a functional group selected from an epoxy group, an oxazoline group and a carboxyl group.

<5> The conductive masterbatch according to any one of items <1> to <4>, wherein the vinyl monomer having the functional group reactive with the polyamide resin is at least a monomer selected from unsaturated carboxylic acid monomers, epoxy group-containing unsaturated monomers and oxazoline group containing unsaturated monomers.

<6> The conductive masterbatch according to any one of items <1> to <5>, wherein the volume resistivity is 10Ω·cm or less.

<7> A resin composition, comprising:

the conductive masterbatch according to any one of items <1> to <6> and a thermoplastic resin.

<8> The resin composition according to item <7>, wherein the content of a conductive filler is in the range of 1% by mass to 20% by mass.

<9> The resin composition according to one of items <7> and <8>, wherein the flocculate scale of the conductive filler in the resin composition is 4% or less.

According to the present invention, the present invention can provide a conductive masterbatch that has an excellent kneadability/manufacturability and formability and an excellent dispersibility of conductive fillers such as a carbon black, and shows stable conductivity even when a large amount of such conductive fillers are contained therein, and a resin composition containing the conductive masterbatch.

BEST MODE FOR CARRYING OUT THE INVENTION

Conductive Masterbatch

The conductive masterbatch of the present invention contain at least a conductive filler selected from carbon blacks and carbon nanotubes, a polyamide resin, and a particular copolymer, and may further contain other suitable components upon necessity.

—Conductive Filler—

The carbon blacks and carbon nanotubes can be used alone or in combination as conductive fillers.

—Carbon Black—

The selection of the above-stated carbon blacks is not particularly limited, and suitable one or more can be chosen in accordance with purpose. Examples thereof include oil-furnace black, which is produced from a partial combusted petroleum stock processed in an oil-furnace method, Ketjenblack produced by the Special Furnace Method, acetylene black produced from acetylene gas, lampblack, which is produced from a raw material directly burned in a closed space, thermal black produced from thermally decomposed natural gas, and channel black, which is obtained by exposing a bottom plane of a channel steel to a diffuse flame and collecting the deposited soot.

Moreover, from a conductive viewpoint, carbon blacks having n-dibutyl phthalate (may be hereafter called DBP) oil absorption, measured by the method stated in JIS K 6217-9, in the range of 150 ml/100 g to 600 ml/100 g are preferable, and those having DBP oil adsorption in the range of 300 ml/100 g to 550 ml/100 g are more preferable. When that DBP oil absorption is more than 600 ml/100 g, the kneadability/manufacturability and formability of the conductive masterbatch will be degraded, and because viscosity thereof becomes high, sufficient dispersion of carbon black may not be obtained, and when less than 150 ml/100 g, because the required concentration level of carbon black in order to obtain desired conductivity increases, the mechanical properties of an obtained conductive masterbatch may be degraded.

Examples of marketed carbon blacks include Ketjenblacks manufactured by Ketjenblack International Company, which include Ketjenblack EC (having DBP oil absorption in the range of 350 ml/100 g to 385 ml/100 g) and Ketjenblack black EC-600JD (having DBP oil absorption in the range of 480 ml/100 g to 520 ml/100 g).

Those carbon blacks can be used alone or in combination.

The content of carbon black in the conductive masterbatch is preferably in the range of 10% by mass to 40% by mass, and more preferably 10% by mass to 30% by mass, when only using the carbon black as a conductive filler. When the content of carbon blacks is less than 10% by mass, the conductivity of the conductive masterbatch may be degraded, and when more than 40% by mass, viscosity increases during melting and kneading processes, resulting in excessive heat generation, and further, formability may be degraded as flowability decreases.

—Carbon Nanotube—

The selection of the carbon nanotubes is not particularly limited, and suitable carbon nanotubes can be chosen according to purpose. Examples thereof include monolayer- and multilayer-nanotubes. They can be obtained by, for example, a vapor growth method, an arcing method and a laser evaporating method.

An average fiber diameter of those carbon nanotubes is preferably in the range of 1 nm to 100 nm, and more preferably 3 nm to 80 nm, and further preferably 5 nm to 70 nm. Desired conductivity may not be obtained in the conductive masterbatch when the average fiber diameter is less than 1 nm, and when it exceeds 100 nm, the productivity of the carbon nanotubes may be reduced. On the other hand, desired conductivity will be obtained in the conductive masterbatch when the average fiber diameter is in the range of 5 nm to 70 nm, and further, a higher productivity of the carbon nanotubes will be obtained.

Moreover, an average aspect ratio of the carbon nanotubes is preferably 5 or more, more preferably 50 or more, and further preferably 100 or more.

Desired conductivity may not be obtained in the conductive masterbatch when the average aspect ratio is less than 5. On the other hand, when the average aspect ratio is 100 or more, there is an advantage in that conductivity can be obtained more efficiently.

The carbon nanotubes can be produced by methods disclosed in, for example, JP-A No. 62-500943, JP-A No. 02-503334 and JP-A No. 11-256430.

Those carbon nanotubes can be used alone or in combination.

The content of the carbon nanotubes in the conductive masterbatch is preferably in the range of 10% by mass to 40% by mass, and more preferably 10% by mass to 30% by mass, when only using the carbon nanotubes as a conductive filler. When the content of the carbon nanotubes is less than 10% by mass, sufficient dispersion of the carbon nanotubes may not be obtained, and when more than 40% by mass, viscosity may increase during melting and kneading processes, resulting in excessive heat generation, and further, formability may be degraded as flowability decreases.

The total content of the carbon nanotubes and the carbon blacks in the conductive masterbatch is preferably in the range of 10% by mass to 40% by mass, and more preferably 10% by mass to 30% by mass, when using both the carbon nanotubes and the carbon blacks in combination as conductive fillers.

Each of the conductive fillers can be used alone or in combination.

—Polyamide Resin—

The selection of the above-mentioned polyamide resin is not particularly limited, and suitable one can be chosen according to purpose. Examples thereof include aliphatic polyamide resins having a structural unit derived from lactams; aliphatic polyamide resins obtained through the polymerization of an aminocarboxylic acid; aliphatic polyamide resins obtained through the polycondensation of a saturated-fatty-acid dicarboxylic acid with 4 to 12 carbon atoms and an aliphatic diamine with 2 to 12 carbon atoms; and thermoplastic aromatic polyamide resins.

Preferred examples of the polyamide resins include polyamide 4,6; polyamide 6; polyamide 6,6; polyamide 6,10; polyamide 6,12; Polyamide MXD, 6 (MXD:m-xylylene diamine); polyamide 6, T; polyamide 6, I; polyamide 11; and polyamide 12.

Those polyamide resins can be used alone or in combination. When two or more sorts of such polyamide resins are used, known machines such as a kneading machine and a parallel extruder can be used to conduct, for example, a kneading process and a parallel-extrusion process.

The content of the polyamide resin in the conductive masterbatch is preferably in the range of 50% by mass to 89.9% by mass, and more preferably 70% by mass to 89.9% by mass. When the content of the polyamide resin is less than 50% by mass, the formability and physical strength of the conductive masterbatch may be degraded, and when more than 89.9% by mass, desirable conductivity may not be obtained.

—Copolymer—

The above-mentioned copolymer is a copolymer which includes at least a vinyl monomer having a functional group reactive with the above-stated polyamide resins and a styrene as monomer units. Of copolymers having such characteristic, it is preferable to use a graft copolymer wherein a polymer side-chain, which has at least a monomer unit selected from styrenes and meta-acrylates, is bond to a polymer main-chain, which includes at least a vinyl monomer having a functional group reactive with the polyamide resins and a styrene as monomer units.

The selection of the above-stated "functional group reactive with the polyamide resins" is not particularly limited, and suitable one can be chosen according to purpose. Preferred examples thereof include functional groups reactive with a carboxyl group or amino group combined with the terminal of a polyamide resin, and examples of such functional groups include epoxy group, oxazoline group and carboxy group.

The selection of the above-stated "vinyl monomer having a functional group reactive with the polyamide resins" is not particularly limited, and it can be chosen suitably according to purpose. Preferred examples thereof include unsaturated carboxylic acid monomers such as acrylic acids and methacrylic acids; epoxy group-containing unsaturated monomers such as glycidyl methacrylates; and oxazoline group-containing unsaturated monomers such as isopropenyl oxazolines.

A production method of the above-stated copolymers is not limited, and a suitable method can be chosen from known production methods such as one described in JP-A No. 03-59071.

Examples of the copolymers include marketed copolymers. Examples of marketed copolymers between a styrene and an epoxy group-containing monomer include REZEDA GP-305 (manufactured by Toagosei Chemistry), marketed copolymers between a styrene and a carboxyl group-containing monomer include ARUFON XD-935 (manufactured by Toagosei Chemistry), and marketed copolymers between a styrene and an oxazoline group-containing monomer include RPS-1005 (manufactured by NIPPON SHOKUBAI Co., Ltd.). Of those copolymers, it is preferable to use REZEDA GP-305, a graft copolymers, wherein a polymer side-chain, which has a poly meta-acrylate as a monomer unit, is bond to a polymer main chain, which has a vinyl monomer having an epoxy functional group and a styrene as monomer units.

Those copolymers can be used alone or in combination.

The content of the copolymer in the conductive masterbatch is preferably in the range of 0.1% by mass to 10% by mass, and more preferably 1% by mass to 5% by mass. When the content of the copolymer is less than 0.1% by mass, dispersion of carbon black may be insufficient, resulting in nonuniformity in conductivity, and when more than 10% by mass, although flowability may be improved, physical properties such as strength may be degraded.

—Other Component—

The selection of the other components is not particularly limited as long as the physical properties of the conductive masterbatch will not be degraded by adding the components. Suitable components therefor can be chosen according to purpose, and the selection thereof include known additives such as a flame retarder, a pigment, a dye, reinforcers (carbon fiber etc.), a filling agent, a heat-resistant agent, a weathering stabilizer, a lubricant, a releasing agent, a crystal nucleus agent, a plasticizer, a fluidity improving agent, an antistatic agent, a compatibilizer and a stabilizer. The content of the other components in the conductive masterbatch is not particularly limited and can be set at a suitable level as long as the content is within a range in which the physical properties of the conductive masterbatch will not be degraded.

—Production Method—

A production method of the conductive masterbatch is not particularly limited, and suitable one can be chosen from known production methods of conductive resins according to purpose. Examples thereof include a method in which components are uniformly mixed at a time using a premixing machine such as a tumbler or a HENSCHEL mixer; and a method in which components are separately fed to a kneading machine using a fixed-quantity or a constant-volume feeder. Moreover, an apparatus for producing the conductive masterbatch is not particularly limited, and suitable one can be chosen according to purpose. Examples thereof include a twin screw extruder, a single screw extruder, a roll, a kneader and a Banbury mixer. Of those apparatuses, the twin screw extruder which is equipped with an upstream feed hopper and one or more downstream feed hoppers is desirable because it can mix the polyamide resin and the copolymers before feeding the conductive fillers.

—Volume Resistivity—

The volume resistivity of the conductive masterbatch is preferably 10Ω·cm or less, and more preferably 5Ω·cm or less. When the volume resistivity is more than 10Ω·cm, desirable conductivity may not be obtained. The volume resistivity can be measured by, for example, the below mentioned method, described in Example.

—Application—

The conductive masterbatch has an excellent kneadability/manufacturability, formability and an excellent dispersibility of conductive fillers, and shows stable conductivity even when a large amount of the conductive fillers are contained therein, and thus, the conductive masterbatch can be used for, for example, the below mentioned resin composition of the present invention.

(Resin Composition)

The resin composition of the present invention contains the conductive masterbatch and a thermoplastic resin, and may further contain other suitable components upon necessity.

—Conductive Masterbatch—

The conductive masterbatch is as described above.

The conductive masterbatch can be used alone or in combination with one or more different conductive masterbatches.

The content of the conductive masterbatch in the resin composition is not particularly limited and can be set at a suitable level according to purpose. However, it is preferably in the range of 15% by mass to 85% by mass, and more preferably 30% by mass to 50% by mass. When the content of the conductive masterbatch is less than 15% by mass, conductivity of the resin composition may be insufficient, and when more than 85% by mass, although conductivity increases, formability as well as physical strength may be degraded.

In addition, the content of the conductive fillers in the resin composition is preferably in the range of 1% by mass to 20% by mass, and more preferably 2% by mass to 15% by mass. When the content of the conductive fillers is less than 1% by mass, conductivity of the resin composition may be insufficient, and when more than 20% by mass, although conductivity increases, formability as well as physical strength may be degraded. The content of the conductive fillers can be controlled by adjusting the content of the conductive masterbatch.

—Thermoplastic Resin—

The selection of the above-stated thermoplastic resin is not limited, and a suitable resin can be chosen according to purpose. Examples thereof include polyethylene resins, polypropylene resins, ethylene-vinylacetate copolymers, copolymers of an acrylate or a methacrylate and other compounds, styrene resins, polyamide resins, polycarbonate resins, polyester resins, polyvinyl chloride resins, thermoplastic elastomers, polyacetal resins, modified-polyphenylene-ether resins, polysulfone resins, modified polysulfone resins, polyallyl sulfone resins, polyketone resins, polyetherimide resins, polyarylate resins, polyphenylene sulfide resins, liquid crystal polymers, polyether sulfone resins, polyether-ether-ketone resins, polyimide resins, polyamide imide resins, and super engineer plastic resins.

The polyethylene resins are not particularly limited, and a suitable resin can be chosen from, for example, high-, middle-, and low-density polyethylenes according to, for example, required physical strength, heat-resisting property and formability.

The above-stated polypropylene resins are not particularly limited, and, according to purpose, a suitable resin can chosen from, for example, poly-1,2-butadiene resins, etc.

The above-stated copolymers of an acrylate or a methacrylate and other compounds are not particularly limited, and, according to purpose, suitable one can be chosen from, for example, copolymers of an acrylate or a meta-acrylate, such as methyl, ethyl, propyl, and butyl, and ethylene, chlorinated copolymers of these copolymers, and mixtures of two or more polymers of these polymers.

The above-stated styrene resins are not particularly limited, and, according to purpose, a suitable resin can be chosen from, for example, polystyrene resins, ABS plastics and AS resins.

The above-stated polyamide resins are not particularly limited, and, according to purpose, a suitable resin can be chosen from, for example, polyamide 6, polyamide 6,6, polyamide 10, polyamide 12 and polyamide MXD.

The above-stated polyester resins are not particularly limited, and, according to purpose, a suitable resin can be chosen from, for example, polyethylene terephthalate resin and polybutylene terephthalate resin.

The above-stated thermoplastic elastomer is not particularly limited, and, according to purpose, suitable one can be chosen from, for example, thermoplastic ester, etc.

The above-stated super engineer plastic resins are not particularly limited, and, according to purpose, a suitable resin can be chosen from, for example, fluorine resins, etc.

Those resin compositions may be used alone or in combination.

The content of the thermoplastic resins in the resin composition is preferably in the range of 85% by mass to 15% by mass, and more preferably 70% by mass to 50% by mass. When the content of the thermoplastic resins is more than 85% by mass, sufficient conductivity may not be obtained in an obtained resin composition, and when less than 15% by mass, although conductivity of the resin composition increases, formability, as well as physical strength thereof, may be degraded.

—Other Component—

As in the case of the other components in the conductive masterbatch, the other components are not particularly limited and can be chosen as long as the components will not degrade the physical properties of the resin composition. Examples thereof include the above-stated known additives. The content of the other components is not particularly limited and can be set at a suitable level as long as the content is within a range in which the physical properties of the resin composition will not be degraded.

—Production Method—

A production method of the above-stated resin compositions is not particularly limited, and, according to purpose, suitable method can be chosen from, for example, a dry blend method and a melting blend method. Examples of an apparatus used for the dry blend method include a tumbler, a super mixer, etc. Examples of an apparatus used for the melting blend method include a single spindle- and a twin spindle-extruder, a Banbury mixer, a roller, a kneader, etc. A feeding method used therefor may be a single- or a multi-stage feeding method. A production method to form a compact from the resin compositions is not particularly limited, and, according to purpose, a suitable method can be chosen from, for example, an Injection forming, an extrusion forming, a blow forming and a press forming.

—Other Properties of Resin Composition—

A flocculate scale of the above-mentioned conductive fillers in the resin composition is preferably 4% or less, and more preferably 2.5% or less.

When the flocculate scale is more than 4%, desirable dispersion of the conductive fillers may not be obtained.

The flocculate scale can be measured by, for example, the method described in below-mentioned Example.

The volume resistivity of a compact made from the resin composition is preferably $1 \times 10^5 \Omega \cdot cm$ or less, and more preferably $1 \times 10^4 \Omega \cdot cm$ or less. When the volume resistivity is more than $1 \times 10^5 \Omega \cdot cm$, desirable conductivity may not be obtained. Additionally, the volume resistivity can be measured by, for example, the method described in below-mentioned Example.

A melt flow rate (it may be hereafter called MFR) of the resin composition in the compact is preferably 6 g/10 minutes or more, and more preferably 8 g/10 minutes or more, under a temperature of 280° C. and 12.3N. When the MFR is less than 6 g/10 minutes, desirable formability may not be obtained.

—Application—

Because the resin composition contains the conductive masterbatch of the present invention, which has stable conductivity, the resin composition can be used especially in applications in which conductivity is required. Examples of the applications include office automation equipment/components, home electric products and autoparts.

EXAMPLES

Examples of the present invention will be described below; however, they are not intended to limit the range of the invention.

Except in sections describing the flocculate scale, the term "%" refers to "% by mass" in Examples unless otherwise mentioned.

Example 1

Preparation of Conductive Masterbatch

Using a uni-direction-twin spindle-extruder with screw diameter of 57 mm and a cylinder/a die with a temperature of 260° C. to 280° C., a mixture, in which the content of polyamide 6 (T840, manufactured by Toyobo Co., Ltd.) was 84%, carbon black (Ketjenblack EC600JD (it may be hereafter called CB-1), manufactured by Ketjenblack international company) whose DBP oil absorption measured by the method stated in JIS K 6217-9 was 480 ml/100 g to 520 ml/100 g was 13%, and styrene or epoxy group-containing polymer (REZEDA GP-305 (it may be hereafter called copolymer-1), manufactured by Toagosei) was 3%, was mixed to prepare the conductive masterbatch of Example 1. During mixing, polyamide 6 and copolymer-1 were simultaneously supplied from the upstream feed hopper of the twin spindle-extruder, and CB-1 was supplied from the downstream feed hopper thereof, and then melting/kneading and pelletizing were processed thereto.

The kneadability/manufacturability, carbon dispersibility and volume resistivity of the thus prepared conductive masterbatch were measured and evaluated. The results are shown in Table 1.

<Kneadability and Manufacturability>

The kneadability/manufacturability of the conductive masterbatch was evaluated as follows. That is, during kneading/manufacturing process, increased levels of motor load current were measured, and then each level increase was evaluated using the following criteria: "poor" (when the level increase was remarkable), "rather poor" (when the level increase was little remarkable) and "good" (when the level increase was not remarkable).

<Carbon Dispersibility>

Using the below-mentioned criteria, the carbon dispersibility of the conductive masterbatch was evaluated as a measure of the dispersibility of the conductive masterbatch. That is, strand-shaped conductive masterbatches extruded from the above-mentioned twin spindle-extruder and a pressed compact formed into 76 mm long by 76 mm wide by 3.2 mm in thick through press forming under a temperature of 290° C. were prepared, and concavo-convex degrees of the masterbatch and the compact were visually observed and they were classified into three grades, "poor", "rather poor" and "good."

<Volume Resistivity>

Using the below-mentioned criteria, the volume resistivity was evaluated as a measure of conductivity of the conductive masterbatch. That is, after the conductive masterbatches were formed into the pressed compact, a conductive paint was applied by a width of 5 mm at the both sides of the compact and the paint was dried to thereby obtain a sample, and then, according to Wheatstone Bridge method (stated in SRIS (Society of Rubber Industry, Japan) 2301-1696), the resistance at constant current was directly measured using a digital match meter. The value of the volume resistivity ($\Omega \cdot cm$) was computed by the following formula from the measured value of the resistance.

Volume resistivity ($\Omega \cdot cm$)=resistance ($\Omega$)×thickness (cm)×width (cm)/distance between the paints (cm)

Example 2

Preparation of Conductive Masterbatch

Except a styrene and carboxyl group-containing polymer (ARUFON XD-905 (it may be hereafter called copolymer-2), manufactured by Toagosei) was used instead of copolymer-1 (while the content of copolymer-2 was 3%), the conductive masterbatch of Example 2 was prepared, and the kneadability/manufacturability, volume resistivity and carbon dispersibility thereof were measured and evaluated in the same manner of Example 1. The results are shown in Table 1.

Example 3

Preparation of Conductive Masterbatch

Except a styrene and oxazoline group-containing polymer (RPS-1005 (it may be hereafter called copolymer-3), manufactured by NIPPON SHOKUBAI) was used instead of copolymer-1 (while the content of copolymer-3 was 3%), the conductive masterbatch of Example 3 was prepared, and the kneadability/manufacturability, volume resistivity and carbon dispersibility thereof were measured and evaluated in the same manner of Example 1. The results are shown in Table 1.

Example 4

Preparation of Conductive Masterbatch

Except the content of polyamide 6 was set at 74% and copolymer-1 at 1%, and a carbon black (Ketjenblack EC (it may be hereafter called CB-2), manufactured by Ketjenblack international company) whose DBP oil absorption was 350 ml/100 g to 385 ml/100 g was used instead of CB-1 (while the content of CB-2 was 25%), the conductive masterbatch of Example 4 was prepared, and the kneadability/manufacturability, volume resistivity and carbon dispersibility thereof were measured and evaluated in the same manner of Example 1. The results are shown in Table 1.

Example 5

Preparation of Conductive Masterbatch

Except polyamide 6,6 (Amilan CM3007, manufactured by Toray Industries, Inc.) was used instead of polyamide 6 (while the content of polyamide 6,6 was 84%), the conductive masterbatch of Example 5 was prepared, and the kneadability/manufacturability, volume resistivity and carbon dispersibility thereof were measured and evaluated in the same manner of Example 1. The results are shown in Table 1.

Example 6

Preparation of Conductive Masterbatch

Except the content of polyamide 6 was set at 83% and copolymer-1 at 2%, and carbon nanotubes (it may be hereafter called CNT) whose average fiber diameter was 10 nm and average fiber length was 10 μm were used instead of CB-1 (while the content of the CNT was 15%), the conductive masterbatch of Example 6 was prepared, and the kneadability/manufacturability, volume resistivity and carbon dispersibility thereof were measured and evaluated in the same manner of Example 1. The results are shown in Table 1.

Example 7

Preparation of Conductive Masterbatch

Except the content of polyamide 6 was set at 83%, CB-1: at 5% and the CNT at 10% and copolymer-2 was used instead of copolymer-1 (while the content of copolymer was 2%), the conductive masterbatch of Example 7 was prepared, and the kneadability/manufacturability, volume resistivity and carbon dispersibility thereof were measured and evaluated in the same manner of Example 1. The results are shown in Table 1.

Example 8

Preparation of Conductive Masterbatch

Except the content of polyamide 6 was set at 63%, and a carbon black (DENKA BLACK HS-100 (it may be hereafter called CB-3), manufactured by DENKI KAGAKU KOGYO) whose DBP oil absorption was 200 ml/100 g to 220 ml/100 g and copolymer-2 were used instead of CB-1 and copolymer-1 respectively (while the content of CB-3 was 35% and copolymer-2 was 2%), the conductive masterbatch of Example 8 was prepared in the same manner of Example 1, and the kneadability/manufacturability, volume resistivity and carbon dispersibility thereof were measured and evaluated. The results are shown in Table 1.

Comparative Example 1

Preparation of Conductive Masterbatch

Except the content of polyamide 6 was set at 87% and CB-1 at 13%, and copolymer was not used, the conductive masterbatch of Comparative Example 1 was prepared, and the kneadability/manufacturability thereof were measured and evaluated in the same manner of Example 1. The results are shown in Table 2. Additionally, as shown in Table 2, the conductive masterbatch of Comparative Example 1 was not be able to be kneaded, so that the volume resistivity and the carbon dispersibility thereof were not be able to be evaluated.

Comparative Example 2

Preparation of Conductive Masterbatch

Except the content of copolymer-1 was set at 1% and CB-1 at 9%, the conductive masterbatch of Comparative Example 2 was prepared, and the kneadability/manufacturability, volume resistivity and carbon dispersibility thereof were measured and evaluated in the same manner of Example 1. The results are shown in Table 2.

Comparative Example 3

Preparation of Conductive Masterbatch

Except an epoxy group-containing polymer (REZEDA GP-303 (it may be hereafter called copolymer-4), manufactured by Toagosei Chemistry), which does not contain styrene, was used instead of copolymer-1 (while the content of copolymer-4 was 3%), the conductive masterbatch of Comparative Example 3 was prepared, and the kneadability/manufacturability, volume resistivity and carbon dispersibility thereof were measured and evaluated in the same manner of Example 1. The results are shown in Table 2.

Comparative Example 4

Preparation of Conductive Masterbatch

Except the content of polyamide 6 was set at 85%, the CNT was used instead of CB-1 (while the content of the CNT was 15%), and the copolymer was not used, the conductive masterbatch of Comparative Example 4 was prepared, and the kneadability/manufacturability, volume resistivity and carbon dispersibility thereof were measured and evaluated in the same manner of Example 6. The results are shown in Table 2.

Comparative Example 5

Preparation of Conductive Masterbatch

Except the content of polyamide 6 was set at 53%, CB-3 at 45% and copolymer-2 at 2%, the conductive masterbatch of Comparative Example 5 was prepared, and kneadability/manufacturability thereof were measured and evaluated in the same manner of Example 8. The results are shown in Table 2. Additionally, as shown in Table 2, the conductive masterbatch of Comparative Example 5 was not be able to be kneaded, so that the volume resistivity and the carbon dispersibility thereof were not be able to be evaluated.

TABLE 1

| Composition (% by mass) | | Example 1 | Example 2 | Example 3 | Example 4 | Example 5 | Example 6 | Example 7 | Example 8 |
|---|---|---|---|---|---|---|---|---|---|
| Polyamide 6 | | 84 | 84 | 84 | 74 | 0 | 83 | 83 | 63 |
| Polyamide 6,6 | | 0 | 0 | 0 | 0 | 84 | 0 | 0 | 0 |
| CB-1 | | 13 | 13 | 13 | 0 | 13 | 0 | 5 | 0 |
| CB-2 | | 0 | 0 | 0 | 25 | 0 | 0 | 0 | 0 |
| CB-3 | | 0 | 0 | 0 | 0 | 0 | 0 | 0 | 35 |
| CNT | | 0 | 0 | 0 | 0 | 0 | 15 | 10 | 0 |
| Copolymer-1 | | 3 | 0 | 0 | 1 | 3 | 2 | 0 | 0 |
| Copolymer-2 | | 0 | 3 | 0 | 0 | 0 | 0 | 2 | 2 |
| Copolymer-3 | | 0 | 0 | 3 | 0 | 0 | 0 | 0 | 0 |
| Copolymer-4 | | 0 | 0 | 0 | 0 | 0 | 0 | 0 | 0 |
| Kneadability/ Manufacturability | | Good | Good | Good | Good | Good | Good | Good | Good |
| Volume Resistivity ($\Omega \cdot cm$) | | 2 | 4 | 3 | 3 | 2 | 1 | 0.8 | 9 |
| Carbon Dispersibility | Strand | Good | Good | Good | Good | Good | Good | Good | Good |
| | Pressed compact | Good | Good | Good | Good | Good | Good | Good | Good |

TABLE 2

| Composition (% by mass) | | Comparative Example 1 | Comparative Example 2 | Comparative Example 3 | Comparative Example 4 | Comparative Example 5 |
|---|---|---|---|---|---|---|
| Polyamide 6 | | 87 | 90 | 84 | 85 | 53 |
| Polyamide 6,6 | | 0 | 0 | 0 | 0 | 0 |
| CB-1 | | 13 | 9 | 13 | 0 | 0 |
| CB-2 | | 0 | 0 | 0 | 0 | 0 |
| CB-3 | | 0 | 0 | 0 | 0 | 45 |
| CNT | | 0 | 0 | 0 | 15 | 0 |
| Copolymer-1 | | 0 | 1 | 0 | 0 | 0 |
| Copolymer-2 | | 0 | 0 | 0 | 0 | 2 |
| Copolymer-3 | | 0 | 0 | 0 | 0 | 0 |
| Copolymer-4 | | 0 | 0 | 3 | 0 | 0 |
| Kneadability/Manufacturability | | — | Good | Poor | Good | — |
| Volume Resistivity ($\Omega \cdot cm$) | | — | 400 | 1000 | 700 | — |
| Carbon Dispersibility | Strand | — | Poor | Poor | Poor | — |
| | Pressed compact | — | Rather Poor | Poor | Poor | — |

("—" means data were unable to be collected)

As the results shown in Table 1 and Table 2 show, the conductive masterbatches of Examples 1 to 8 are excellent in the kneadability/manufacturability, volume resistivity and carbon dispersibility compared with Comparative Examples 1 to 5.

Example 9

Production of Resin Composition

Using the twin spindle-extruder and under the same condition of the above-stated preparation of the conductive masterbatch, polyamide 6 (T840, manufactured by Toyobo Co., Ltd.) and the conductive masterbatch produced at Example 1 were mixed and pelletized. The content of polyamide 6 was set at 61.5% and the conductive masterbatch at 38.5%, so that the end concentration of the conductive fillers became around 5%. Thus obtained pellets were then formed into a square-shaped compact, which is 76 mm in length and width and 3.2 mm in thickness, using an injection molding machine, to thereby obtain the resin composition of Example 9. The flocculate scale, volume resistivity and MFR of the obtained resin composition were measured and evaluated. The results are shown in Table 3. Additionally, the volume resistivity was measured in the same method used to measure that of the above-stated conductive masterbatches.

<Flocculate Scale>

The flocculate scale of the resin composition was evaluated as follows. A 1-micrometer-thick slice was pared out of the compact, and then, using an optical microscope of 100 magnifications, a digital photo image of the slice was taken. Using marketed image-processing software, the image was converted into monochrome, and wrinkles of the slice were removed from the image. Then, using marketed image-analysis software, the image was segmented with a threshold value of 10 to 120, and then the flocculate area was measured in pixels. The obtained flocculate area was divided by the gross image area to thereby obtain the flocculate area rate (%). The flocculate area rate is defined as the flocculate scale (%). A smaller flocculate scale means better dispersion of conductive fillers in a resin composition.

<MFR>

The MFR of the resin composition was evaluated as follows. The MFR of the compact was measured under a temperature of 280° C. and a pressure of 12.3N in accordance with ISO 1133 Procedure A standard.

Example 10

Production of Resin Composition

Except the conductive masterbatch of Example 2 was used instead of the masterbatch of Example 1, the resin composition of Example 10 was prepared in the same manner of Example 9. Then, the flocculate scale, volume resistivity and MFR of the obtained resin composition were measured and evaluated in the same manner of Example 9. The results are shown in Table 3.

Example 11

Production of Resin Composition

Except the conductive masterbatch of Example 6 was used instead of the masterbatch of Example 1, the resin composition of Example 11 was prepared in the same manner of Example 9. Then, the flocculate scale, volume resistivity and MFR of the obtained resin composition were measured and evaluated in the same manner of Example 9. The results are shown in Table 3.

Comparative Example 6

Production of Resin Composition

Except the conductive masterbatch of Comparative Example 2 was used instead of the masterbatch of Example 1, the resin composition of Comparative Example 6 was prepared in the same manner of Example 9. Then, the flocculate scale, volume resistivity and MFR of the obtained resin composition were measured and evaluated in the same manner of Example 9. The results are shown in Table 3.

TABLE 3

| Composition (% by mass) | Example 9 | Example 10 | Example 11 | Comparative Example 6 |
|---|---|---|---|---|
| Polyamide 6 | 61.5 | 61.5 | 61.5 | 50 |
| Conductive Masterbatch of Example 1 (The Content of Conductive Filler) | 38.5(5.0) | 0 | 0 | 0 |
| Conductive Masterbatch of Example 2 (The Content of Conductive Filler) | 0 | 38.5(5.0) | 0 | 0 |
| Conductive Masterbatch of Example 6 (The Content of Conductive Filler) | 0 | 0 | 38.5(5.8) | 0 |
| Conductive Masterbatch of Comparative Example 2 (The Content of Conductive Filler) | 0 | 0 | 0 | 50(4.5) |
| Flocculate Scale (%) | 2.3 | 1.8 | 2.4 | 5.1 |
| Volume Resistivity ($\Omega \cdot cm$) | $5 \times 10^3$ | $9 \times 10^3$ | $2 \times 10^2$ | $3 \times 10^5$ |
| MFR (g/10 min.) | 8 | 10 | 19 | 5 |

As the results shown in Table 3 show, the resin compositions of Examples 9 to 11 are excellent in the flocculate scale and volume resistivity compared with Comparative Examples 6. In addition, Examples 9 to 11 have no disadvantage in the MFR and are excellent in flowability.

INDUSTRIAL APPLICABILITY

The conductive masterbatch of the present invention has excellent advantages in that it has an excellent kneadability/manufacturability and formability and an excellent dispersibility of conductive fillers such as a carbon black, and shows stable conductivity even when a large amount of such conductive fillers is contained therein. Because of that reason, the conductive masterbatch and the resin composition, which contain the conductive masterbatch, of the present invention can be used especially in applications in which conductivity is required. Examples of the applications include office automation equipment/components, home electric products and autoparts.

The invention claimed is:

1. A conductive masterbatch, consisting essentially of:
    a conductive filler selected from carbon blacks having n-dibutyl phthalate oil absorption in the range of 150 ml/100 g to 600 ml/100 g and carbon nanotubes,
    a polyamide resin, and
    a copolymer which contains at least a vinyl monomer having a functional group reactive with the polyamide resin and a styrene as monomer units,
    wherein the copolymer is a graft copolymer in which a polymer side-chain, which has at least a monomer unit selected from styrenes and meta-acrylates, is bonded to a polymer main-chain, which has at least a vinyl monomer having a functional group reactive with the polyamide resin and a styrene as monomer units, and
    wherein the content of the conductive filler is in the range of 10% by mass to 40% by mass of the conductive masterbatch.

2. The conductive masterbatch according to claim 1, wherein the functional group reactive with the polyamide resin is reactive with a carboxyl group or an amino group which are bonded to a terminal of the polyamide resin.

3. The conductive masterbatch according to claim 1, wherein
    the functional group reactive with the polyamide resin is at least a functional group selected from an epoxy group, an oxazoline group and a carboxyl group.

4. The conductive masterbatch according to claim 1, wherein
    the vinyl monomer having the functional group reactive with the polyamide resin is at least a monomer selected from unsaturated carboxylic acid monomers, epoxy group-containing unsaturated monomers and oxazoline group-containing unsaturated monomers.

* * * * *